(12) United States Patent
Lanzrath et al.

(10) Patent No.: US 12,741,241 B2
(45) Date of Patent: Sep. 22, 2026

(54) SYSTEM AND METHOD FOR ICE BATH FILTERING

(71) Applicant: Lowtemp Industries LLC, Arvada, CO (US)

(72) Inventors: Levi Garrett Lanzrath, Lakewood, CO (US); Steven Knabe, Arvada, CO (US)

(73) Assignee: Lowtemp Industries LLC, Arvada, CO (US)

( * ) Notice: Subject to any disclaimer, the term of this patent is extended or adjusted under 35 U.S.C. 154(b) by 167 days.

(21) Appl. No.: 18/757,088

(22) Filed: Jun. 27, 2024

(65) Prior Publication Data

US 2025/0001335 A1 Jan. 2, 2025

Related U.S. Application Data

(60) Provisional application No. 63/510,626, filed on Jun. 27, 2023.

(51) Int. Cl.

*B01D 33/42* (2006.01)
*B01D 33/03* (2006.01)
*B01D 39/10* (2006.01)

(52) U.S. Cl.

CPC ......... *B01D 33/42* (2013.01); *B01D 33/0376* (2013.01); *B01D 39/10* (2013.01); *B01D 2201/0423* (2013.01); *B01D 2201/188* (2013.01); *B01D 2239/1216* (2013.01)

(58) Field of Classification Search

CPC .... B01D 33/42; B01D 33/0376; B01D 39/10; B01D 2201/0423; B01D 2201/188; B01D 2239/1216

See application file for complete search history.

(56) References Cited

U.S. PATENT DOCUMENTS

| | | | |
|---|---|---|---|
| 3,330,411 A | 7/1967 | Erlenstadt et al. | |
| 3,366,234 A | 1/1968 | Suhm et al. | |
| 3,410,400 A | 11/1968 | Ward et al. | |
| 3,700,104 A | 10/1972 | Schurrer | |
| 6,216,875 B1 | 4/2001 | Stone | |
| 12,036,485 B1 * | 7/2024 | Smith ................ | B01D 11/0288 |
| 2003/0213731 A1 | 11/2003 | Hukki et al. | |
| 2005/0072717 A1 | 4/2005 | Purohit et al. | |
| 2009/0283454 A1 | 11/2009 | Scott et al. | |

(Continued)

FOREIGN PATENT DOCUMENTS

| | | |
|---|---|---|
| GB | 355309 A | 8/1931 |
| WO | 2020248071 A1 | 12/2020 |
| WO | 2022047591 A1 | 3/2022 |

OTHER PUBLICATIONS

Craftmemore, Clamp Belt Buckle, 2026, Amazon, https://a.co/d/04OeJpqy (Year: 2026).*

(Continued)

*Primary Examiner* — Jacob S. Scott
*Assistant Examiner* — Miraj T. Patel
(74) *Attorney, Agent, or Firm* — Avek IP, LLC

(57) ABSTRACT

Disclosed is a system for filtering trichomes from plants received from an ice bath tank. The ice bath solution is filtered, and then waste water is drained. The filtration system includes nested vertically stacked filter modules. Each module includes a filter that is more restrictive than the filter above it. A vibrating device is attached to the cylindrical exterior of the device using a clamp arrangement.

23 Claims, 5 Drawing Sheets

(56) References Cited

U.S. PATENT DOCUMENTS

| | | | | |
|---|---|---|---|---|
| 2020/0269154 | A1 | 8/2020 | Lantela et al. | |
| 2023/0149830 | A1 | 5/2023 | Profitt | |
| 2023/0193757 | A1 * | 6/2023 | Hamid | E21B 43/385 166/373 |
| 2024/0351071 | A1 * | 10/2024 | Barberi | B02C 23/18 |

OTHER PUBLICATIONS

Invicta Vibrators, Pneumatic Piston Vibrator Motors, 2022, https://web.archive.org/web/20220126172028/https://www.invictavibrators.com/pneumaticseries/ (Year: 2022).*

Electric Motor Warehouse, Single Phase Stainless Steel Electric Motors, 2022, https://web.archive.org/web/20220930072032/https://electricmotorwarehouse.com/single-phase-7/ (Year: 2022).*

* cited by examiner

SYSTEM AND METHOD FOR ICE BATH FILTERING

CROSS-REFERENCE TO RELATED APPLICATIONS

This application claims the benefit of U.S. Provisional Patent Application No. 63/510,626 filed on Jun. 27, 2023, the entire contents of which are herein incorporated by reference.

BACKGROUND

1. Field

Embodiments of this disclosure relate generally to processing of plant material, and more specifically to filtering trichomes which have been separated using a chilled agitation tank.

2. Description of the Related Art

It is known to agitate plant materials in an ice water bath for the purpose of separating trichomes from buds or flowers. These processes normally involve containing the unprocessed materials in a chilled tank which agitates the materials resulting in the desired separation.

The ice water bath agitator typically has a drain that will allow water to escape from the bottom. Between agitation steps, the tank is drained into a bucket or other container lined with filter bags. The filter bags can be of any number, with the lowest lined bag having the smallest aperture size resulting in the highest level of filtration. Each bag lined above this bag will have a progressively larger aperture size, and thus, sequentially, will result in less restrictive filtration. Resulting wastewater passes through the top bag and drains downward in the bucket encountering the progressively more restrictive bag(s).

In a simple two-bag operation, the top bag (the last one placed on the bucket) will retain the separated plant matter, and the bottom bag (the first one used to line the bucket) will retain primarily trichome product. In multiple-bag arrangements, the top bag will restrict out waste product, and the bags below the top bag will retain a variety of products.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, the techniques described herein relate to a system for filtering trichomes from a trichome-including plant material, the system including: a plurality of stackable modules configured to receive a source of an aqueous solution including water and trichomes; a base module included in the plurality of stackable modules; a base screen filter located inside the base module presenting a degree of restriction using a base screen aperture size; one or more auxiliary modules included in the plurality of stackable modules, each of the one or more auxiliary modules being stackable on either the base module or another auxiliary module to form a stack; a first auxiliary module in the one or more auxiliary modules, the first auxiliary module presenting a first auxiliary screen filter having a first aperture size which is greater than the base screen aperture size.

In some embodiments, the techniques described herein relate to a system wherein the one or more auxiliary modules include a second auxiliary module, the second auxiliary module having a second aperture size which is different from the base screen aperture size and the first aperture size.

In some embodiments, the techniques described herein relate to a system wherein the one or more auxiliary modules include a third auxiliary module, the third auxiliary module having a third aperture size which is different from the base screen aperture size, first aperture size, and second aperture size.

In some embodiments, the techniques described herein relate to a system wherein the one or more auxiliary modules include a fourth auxiliary module, the fourth auxiliary module having a fourth aperture size which is different from the base aperture size, first aperture size, second aperture size, and third aperture size.

In some embodiments, the techniques described herein relate to a system wherein each of the plurality of stackable modules are substantially cylindrical.

In some embodiments, the techniques described herein relate to a system including: a vibration-imparting device connected to the stack and configured to impart vibration into the stack.

In some embodiments, the techniques described herein relate to a system wherein the vibration-imparting device includes a single-phase electric motor.

In some embodiments, the techniques described herein relate to a system wherein the vibration-imparting device is constructed of stainless steel.

In some embodiments, the techniques described herein relate to a system wherein the vibration-imparting device is pneumatically driven.

In some embodiments, the techniques described herein relate to a system wherein the vibration-imparting device is connectable to the stack at a location proximate or on the base module.

In some embodiments, the techniques described herein relate to a system wherein the vibration-imparting device is mounted onto the stack using a cylindrical belt.

In some embodiments, the techniques described herein relate to a system wherein the belt includes a first portion and a second portion both configured to be connectable to one another about the stack.

In some embodiments, the techniques described herein relate to a system wherein the first and second portions each have first ends which are connected using a hinge.

In some embodiments, the techniques described herein relate to a system wherein the first and second portions also have second ends which are connectable using a clamp.

In some embodiments, the techniques described herein relate to a system wherein the base screen aperture size in the base screen filter is in a range of about 43-47 microns.

In some embodiments, the techniques described herein relate to a system wherein the base screen aperture size in the base screen filter is about 45 microns in more specific embodiments.

In some embodiments, the techniques described herein relate to a system wherein the base screen aperture size in the base screen filter is the most restrictive of any other screen included in the plurality of stackable modules, and the first screen aperture size in the first auxiliary module is in a range of one of about 215-225 microns, 155-165 microns, 115-125 microns, or 88-92 microns.

In some embodiments, the techniques described herein relate to a system including a nesting arrangement including an exterior shelf extending out from a lower exterior portion of the first auxiliary module which is supported on an upper rim portion of the base module.

In some embodiments, the techniques described herein relate to a system including: a second auxiliary module; a third auxiliary module; and a fourth auxiliary module, each of the second, third, and fourth auxiliary modules configured to be interchangeably nestable above the base module using substantially the same nesting arrangement utilized between the base and first auxiliary modules.

In some embodiments, the techniques described herein relate to a system for filtering trichomes from plant material, the system including: an ice bath agitator tank; a spout allowing for drainage from the ice bath agitator tank; a filtration system including a plurality of stackable filtration modules configured to receive a solution exiting the spout; each of the stackable modules being nestable into a lower module; and a waste-water receptacle configured to receive wastewater after the solution has been filtered using the plurality of stackable filtration modules.

BRIEF DESCRIPTION OF THE DRAWINGS

Illustrative embodiments of the present disclosure are described in detail below with reference to the attached drawing figures, which are incorporated by reference herein and wherein.

Figure 1:
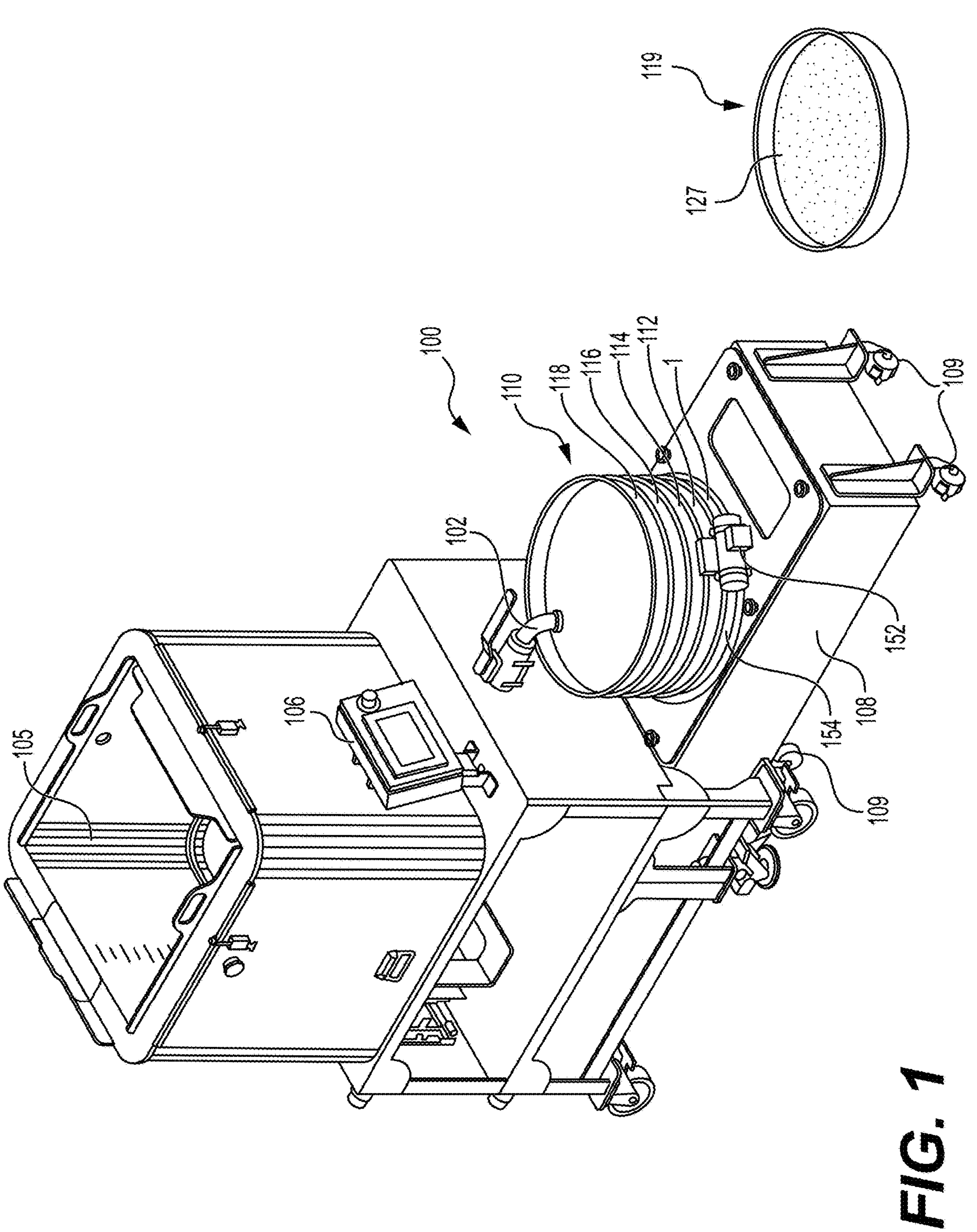
FIG. 1 is a slightly downward and left side perspective view of a system embodiment.

The drawing figures do not limit the invention to the specific embodiments disclosed and described herein. The drawings are not necessarily to scale, emphasis instead being placed upon clearly illustrating the principles of the disclosure.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Resin from glandular trichomes of the cannabis plant may be harvested in various ways. However, many prior methods are inefficient, labor intensive, and/or produce a low-quality product due to inclusion of many plant material contaminants.

Figure 2:
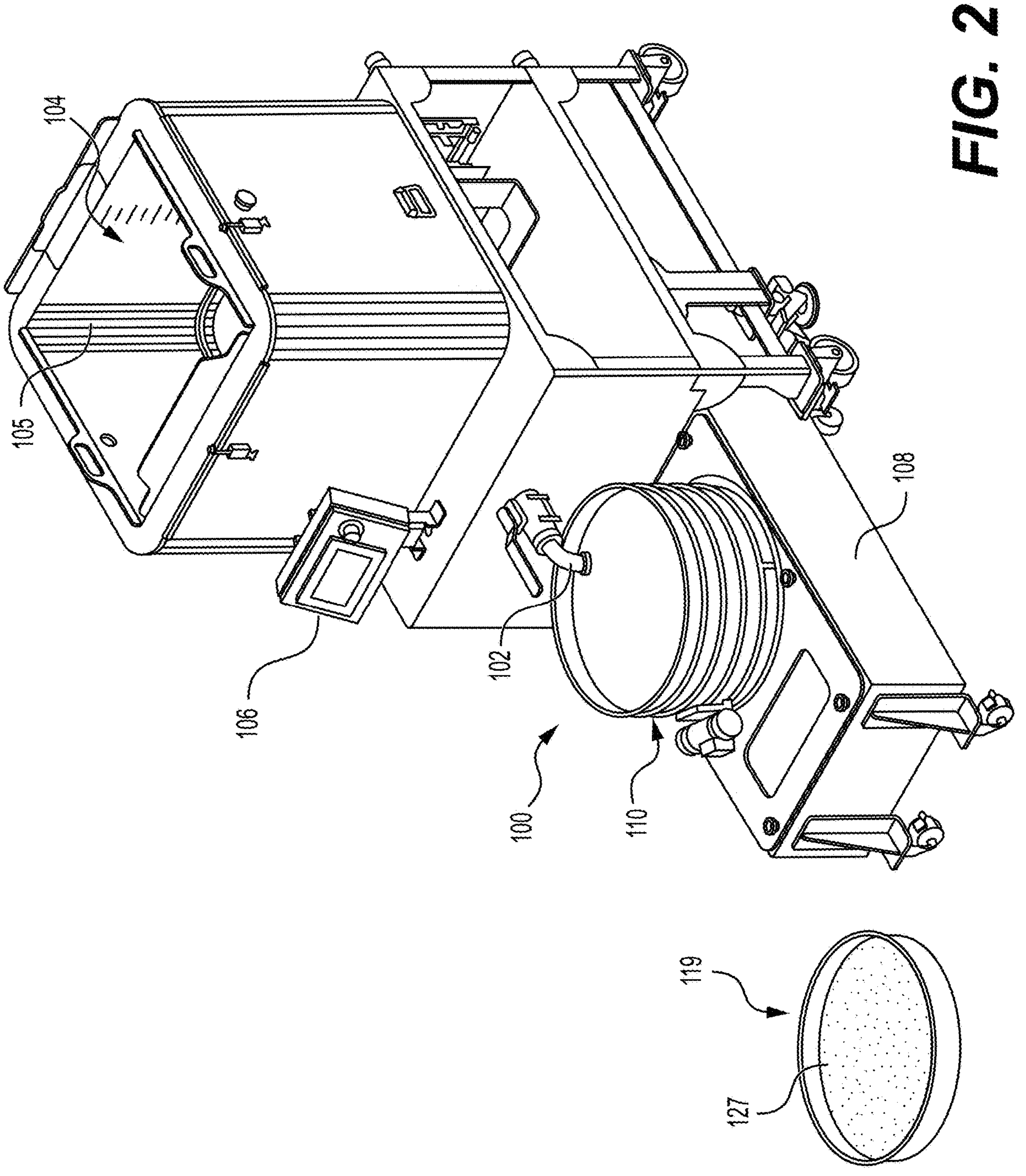
FIG. 2 is a slightly downward and right hand side perspective view of the system embodiment of FIG. 1.

An embodiment 100 is shown, as can be seen in FIGS. 1 and 2. Embodiment 100 is used to receive liquid from an out-spout 102 of an ice bath agitator tank 104 into a filtration system 110 which will be used to break trichomes apart from the plant materials they are found in. The separation of the trichomes in tank 104 is facilitated using an agitator located at the floor of the tank 104. This sort of agitator can, in embodiments, create a swirling action to aid in breaking down substances inside tank 104. In other embodiments, the swirling action can include periodic reversals. Regardless, the agitation of the relatively cold (e.g., 32-degree) ice water in the tank creates trichome separation. In the disclosed embodiment, tank 104 comprises a substantially square shape having four walls and presents a substantially square internal chamber including four rounded internal corners 105. It should be noted, however, that numerous alternative tank shapes could be used and still fall within the broad aspects of the disclosed embodiments. The operations of tank 104 are controlled by a user through control interface 106. After the aqueous solution has been subjected to the turbulence at low temperatures in the tank for a prescribed amount of time, the solution is drained from a spout 102 which is configured to release at a limited flow rate.

The water ultimately flows into a waste-water receptacle 108, but beforehand, the plant matter is filtered out using a vibrating filtration system 110. The filtration system 110 disclosed is divided into a plurality of vertically stacked, substantially cylindrical, nested filtration modules. In FIGS. 1 and 2, these modules include a lower base module 112, as well as four other modules 114, 116, 118, and 119. As shown in FIG. 1, the current optional filtration arrangement involves the use of bottom/base filtration module 112, then a second top-most filtration module 114, a third filtration module 116, and a fourth filtration module 118. An alternate module 119 is placed off to the side and is not being utilized in the current filtration event. In embodiments, the cylindrical module bodies are constructed of stainless steel.

Figure 3:
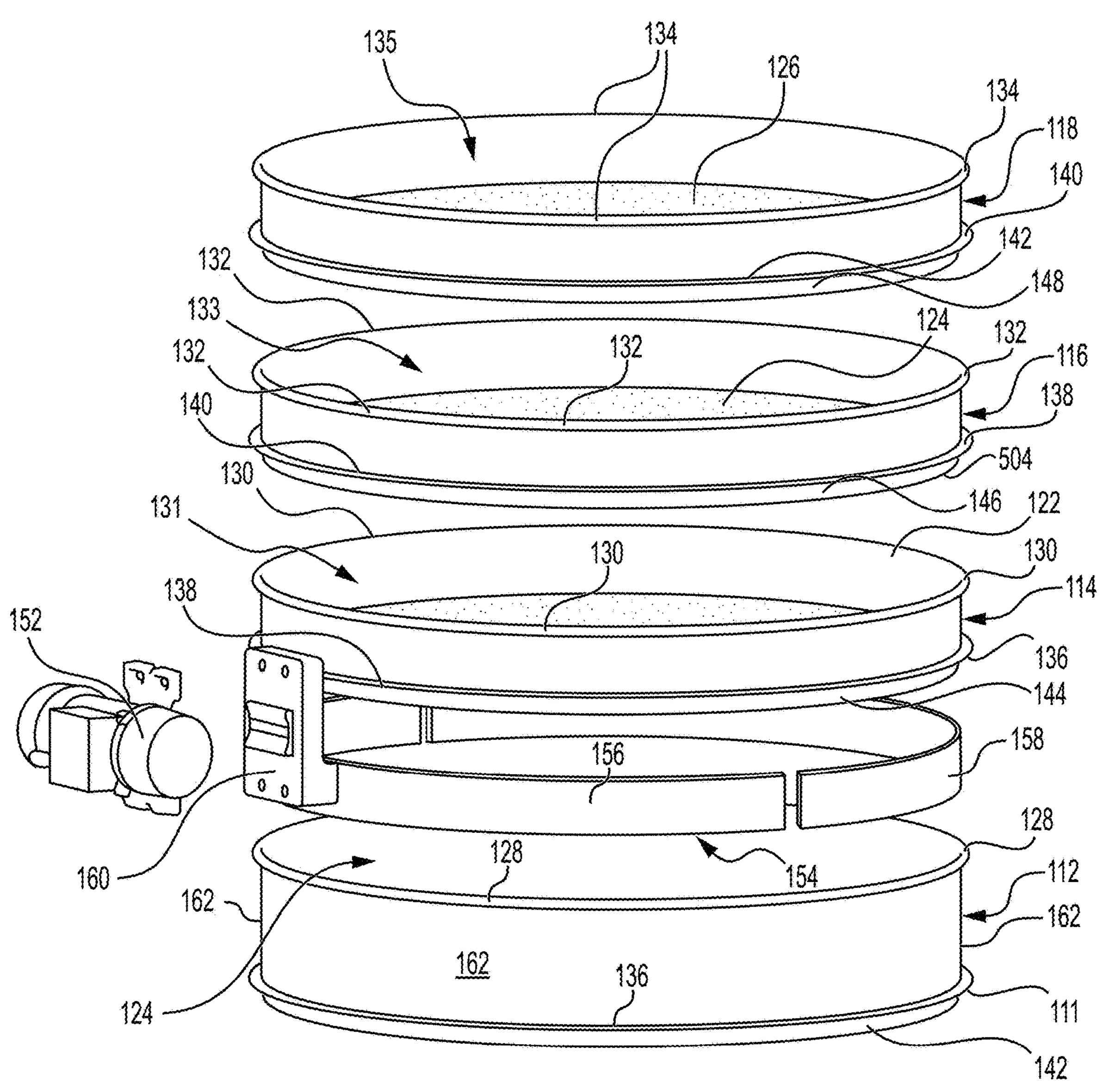
FIG. 3 is an exploded view of the modules of the disclosed system.
Figure 4:
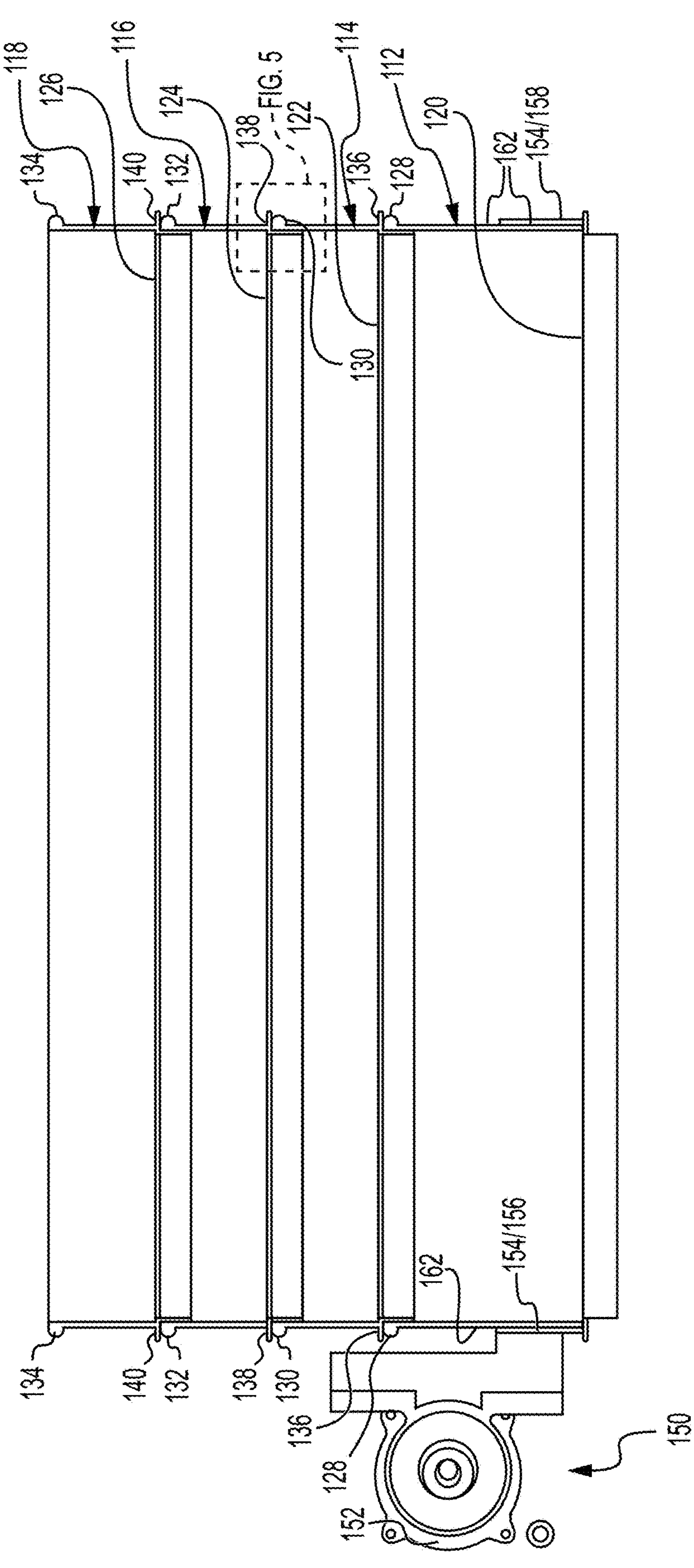
FIG. 4 is a view of the modules when stacked.

Details regarding the components of the filtration system 110 can be seen in the exploded view of FIG. 3 and the cross section of FIG. 4, which is taken at a vertical plane along the center axis of the module.

In embodiments, each of the filtration modules 112, 114, 116, 118, and 119 are configured to include a wire mesh screen filter which is secured into the inside cylindrical walls of each of modules 112, 114, 116, 118, and 119. The screen filters are included at a relatively low vertical position in each of the modules. In embodiments, these mesh filters are constructed of stainless-steel screens. For example, base module 112 includes a screen filter 120. Auxiliary module 114 includes a screen filter 122, auxiliary module 116 includes a screen filter 124, and top auxiliary module 118 includes a screen filter 126. Screen filters 122, 124, and 126 are visible in FIG. 3 and FIG. 4, but base module screen filter 120 can only be seen in the cross section of FIG. 4. It should be noted that in the disclosed embodiment base module 112 has a slightly higher cylindrical wall than the auxiliary modules 114, 116, 118, or 119, which, in the disclosed embodiment, each have relatively shorter side walls of equal height. Auxiliary modules 114, 116, 118, and 119 are all designed to be used alternatively and each can be substituted for the other. Ordinarily in a filtration process, these auxiliary modules will be stacked such that filtration occurs more aggressively from top to bottom with the base module having the smallest pore size.

Since the screen filters 120, 122, 124, 126, and 127 are located near the bottom of each of the cylindrical modules 112, 114, 116, 118, and 119, product receiving areas 131, 133, 135 (see FIG. 3) as well as a receiving area in auxiliary module 119 if used, are established. The product receiving areas are defined by the internal surfaces of each cylindrical module and the upper surfaces of each screen filter. The end user is able to optionally stack any of the four substantially identical screen auxiliary modules 114, 116, 118, and 119 on top of the base module 112 to achieve different filtration objectives. The aggressiveness of each filter is established by the aperture size of each screen, and the user is able to operate a variety of different filtration processes. A user could use any combination of one, two, or three filters selected from the group of four auxiliary modules 114, 116, 118, and 119 for filtering. It is also possible that, in different embodiments, all four could be used, or additional substantially identical, or even diversely configured (e.g., having diverse depths/heights or additional diverse or alternative pore sizes made to be stackable).

The top of each module has a rim established by an outwardly extending ring existing atop each cylindrical module. Each ring is received underneath a shelf extending outwardly where the mesh wire filters are installed. For example, a rim 128 of module 112 supports an outwardly-extending shelf 136 at the bottom of auxiliary module 114. A rim 130 atop cylindrical auxiliary module 114 supports a shelf 138 extending out from auxiliary module 116. Similarly, a rim 132 atop auxiliary module 116 supports a shelf 140. A rim 134 atop auxiliary module 118 is not shown in use for support in FIG. 4 but could be used to support an additional similar auxiliary module above it. Auxiliary module 119 is substantially identical, and thus, has these same rim features.

Each of the cylindrical modules 112, 114, 116, 118, and 119 has a diametrically smaller downwardly-extending portion (e.g., downwardly-extending portions 142, 144, 146, and 148 shown in FIG. 3) below each of shelves 111, 136, 138, and 140 than exists in corresponding top portions extending above shelves. Because of these relative diameters, each of the downwardly-extending portions 142, 144, 146, and 148 have been configured to be removably slid into any of the top portions of any other cylindrical module. This creates stack ability of the cylindrical modules. Thus, the relative diameters accommodate receipt of one module on top of another, while avoiding any interference which would prevent easy separation of the modules after conducting a product sifting process.

Travel of the portions 144, 146, and 148 (see FIG. 3) on a relatively upper auxiliary module down into a relatively lower module is limited by the shelf below it (e.g., shelves 136, 138, and 140) then the lower surface of each of these shelves encounters the upper rim (e.g., rims 128, 130, and 132) of the cylindrical module below it. Thus, the cylindrical auxiliary modules are made to be removably stackable one on the other as shown in FIGS. 1-2, and 4. Again, auxiliary module 119 has all the same features as described for auxiliary modules 114, 116, and 118 above.

In embodiments, e.g., the disclosed embodiment of FIGS. 1-5: (i) the outside diameters of each of the downwardly-extending portions 142, 144, 146, and 148 have identical values to each another; and (ii) the inside diameters of each of the top portions extending upwards directly above the shelves have values that are identical to each other. This makes the modules interchangeable for different applications. For example, FIGS. 1-4 show a stacked arrangement where base module 112 is on the bottom, auxiliary module 114 is directly above module 112, auxiliary module 116 is directly above auxiliary module 114, and auxiliary module 118 is on top of all the other modules. Due to the consistency in diameters, however, any module can be received in any other module, allowing for exponential stacking combinations.

Figure 5:
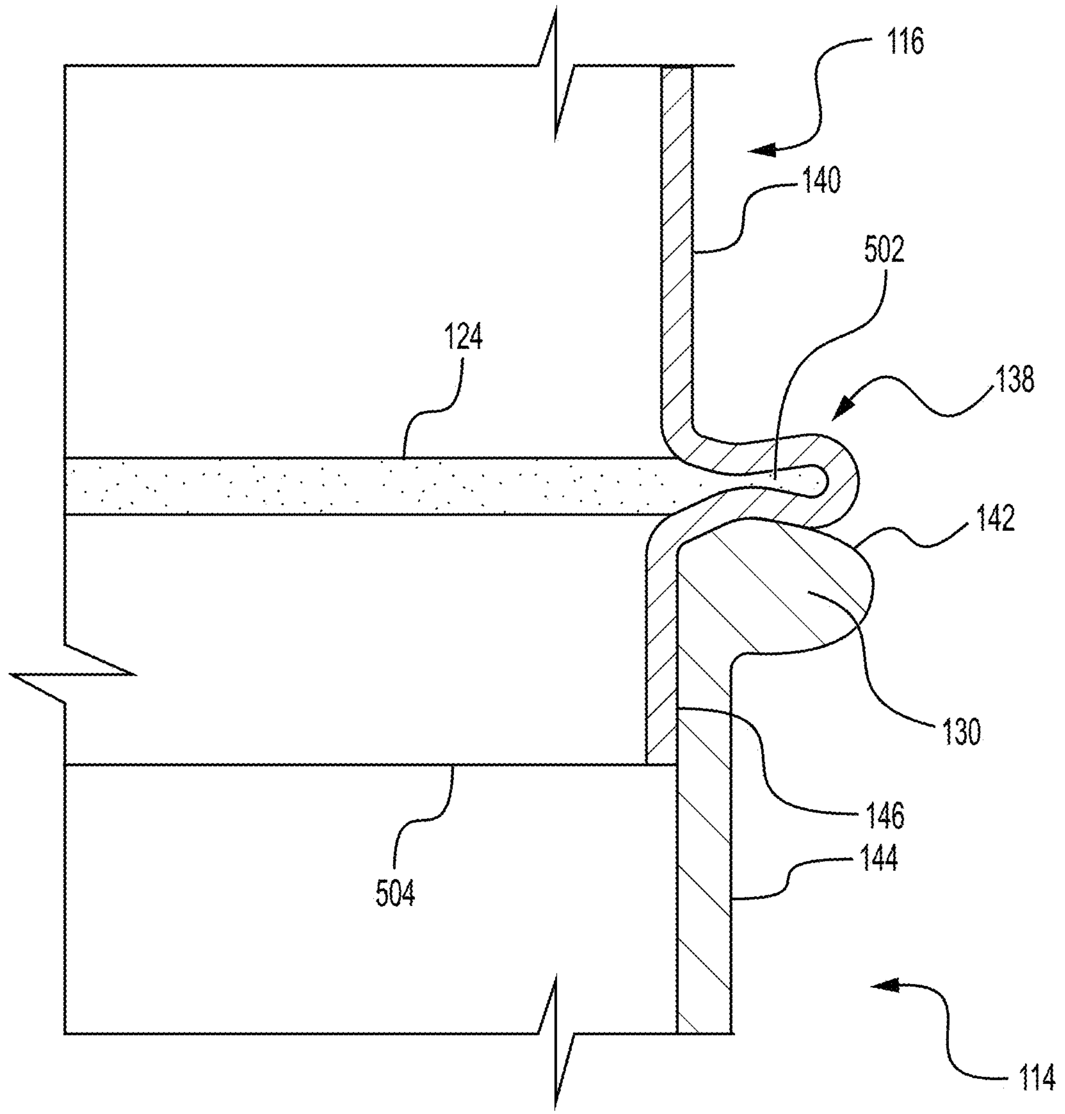
FIG. 5 is a breakout view revealing a module interface taken from FIG. 4.

During manufacture, each screen is made to be substantially taunt across the bottom of each cylinder, and spans inside a lower portion of each module. The breakout drawing of FIG. 5 reveals how an outside margin of each screen filter is pinched into position at the bottom of each cylinder. Referring to back to FIG. 4, it can be seen that FIG. 5 is taken at the interface of modules 114 and 116 where rim 130 supports shelf 138. Shelf 138 extends out a little above the lower edge 504 of the cylindrical module 116.

FIG. 5 reveals that an outer margin 502 of the screen filter 124 is pinched into the internals of the formed shelf 138. More specifically, shelf 138 is created by bending or forming to create an internal receiving area which then compresses the outer margin 502 of the circular filter 124 holding it in place securely, and such that the screen filter is taught and relatively rigid compared with conventional nylon bag filters used in bucket filtering arrangements. Although not depicted, it should be recognized that the arrangements at the interfaces between auxiliary modules 116 and 118 as well as between modules 112 and 114 would be identical or substantially the same as the arrangement revealed in FIG. 5. Similarly, the appearance of the interfaces between all the modules, in embodiments, will be consistent at every diametric position about each cylindrical module. Thus, on an opposite side of the module stack, cross sections at the module interfaces would be symmetrical to what is shown in FIG. 5.

The flow of the cannabis/water solution from the spout 102 from the tank will cascade downward into the top auxiliary module assembled (e.g., auxiliary module 118 shown in FIGS. 1-4) down to the bottom base module 112 and ultimately received into tank 108. Along the way, the cannabis/water solution will pass through any screen filters of auxiliary modules the user has decided to include in the stack. Ordinarily the user will stack the filters in an order wherein the aperture sizes decrease from top to bottom. To that end, the deployed screen filters (e.g., filters 126, then 124, then 122, then 120 are shown in use in modules 118, 116, 114, and 112 in the figures since module 119 including screen 127 is not in use) have been configured with serially reduced pore sizes from top to bottom to allow for the extraction of different cannabis products in each distinct module. This configuration where each screen filter becomes more size restrictive as you go from top to bottom can be, in embodiments, accomplished by particularly sized screen apertures a/k/a pores. For example, in the disclosed embodiment the screen filter 127 in auxiliary module 119 (shown on the ground in FIGS. 1 and 2) are about 220 microns in size. Thus, electing to place auxiliary module 119 atop a stack of other modules will serve to remove relatively large articles from the solution only. Referring to FIG. 4, the rest of the modules include screens having serially decreasing sizes.

For example, the initially encountered screen filter 126 in the FIG. 4 top auxiliary module 118 is configured to have pore sizes in the range of 155-165 microns, or about 160 microns in more specific embodiments. The next filter 124 in auxiliary module 116, in embodiments, can be configured to have pore sizes in the range of about 115-125 microns, or about 120 microns in more specific embodiments. Next filter 122, in embodiments, has been configured to have pore sizes in the range of about 88-92 microns, or about 90 microns in more specific embodiments. The bottom filter 120 in base module 112, in embodiments, has been configured to have pore sizes in the range of 43-47 microns, or about 45 microns in more specific embodiments.

FIGS. 1-4 also show a vibratory arrangement 150 which aids with the separation of cannabis products as the solution cascades down from the spout 102 though the series of modules 118, 116, 114, then 112. In embodiments, system 150 includes a mounted vibratory device 152. In more specific embodiments, vibratory device 152 can be either an electric or pneumatic vibratory device. For an electric vibratory device, a single-phase 50 W 110 AC asynchronous vibration motor comprised of stainless steel has been used. Alternatively, a pneumatically actuated vibratory device 152 might be used so that the device is not electrically connected in environs where exposure to spilled ice water, or other potential hazards exist to reduce shock risk. Either sort of vibration producing device present relatively low noise, require little if any lubrication, and emit vibration at relatively high frequencies. It has also been discovered that the frequencies imparted result in very good water pass through with respect to the screens used for filtration (thus separating the water from the plant materials, and especially on the final screen (e.g., screen filter 120) where water/trichome separation is most difficult due to the relatively small pore sizes. Because of this, in embodiments, the location of the vibratory device is located on the bottom module 112 since it contains the smallest filter.

Regardless, in some embodiments, the vibrator could be configured to frequency in vibrations per minute (VPM). The electrically actuated device vibratory device can then be tuned to a level of vibration to maintain filtration effectiveness of the filter screens.

In embodiments, the vibratory device 152 is mounted onto the module stack using a stainless steel or other kind of belt, ring, or band 154. In embodiments, the band could be of a one-piece construction, but in the disclosed embodiment shown in FIGS. 1-4, the band 154 comprises two separatable halves—a first band half 156, and a second band half 158. FIG. 3 shows a clip-on device 160 on the first half 156. Clip on device 160 is configured to receive and hold the vibrating device 152.

In embodiments, the distinct band portions 156 and 158 are attached at one junction by a hinge (not shown) and at the other junction a clamp (not shown) making the device easily clampable onto the stack at one of any outer cylindrical module surfaces above one of the shelves (e.g., any of shelves 111, 136, 138, and 140) and below any particular outcropped rim (rims 128, 130, 132, or 134). Again here, auxiliary module 119 is substantially identical to the other auxiliary modules except for having a distinct screen aperture size.

In embodiments, the clamp junction (the junction not including a hinge) might include a toggle-clamp incorporating a U-bolt latching mechanism. Those skilled in the art will recognize that these sorts of U-bolt latching systems are made adjustable by threaded nuts which allow for extension and retraction of a U-bolt. The embodiment also includes a second releasable-connection component which, in embodiments, is a catch which extends out from the ring, and includes a notch configured to receive the U-bolt. The U-bolt in such arrangements is made to be retractable using a handle.

In embodiments, a hinge connects the other side of the band portions making the combined band easily clampable onto the outside of the cylindrical module surface. This can be seen in the embodiment shown in FIGS. 3 and 4 where the band halves are secured about an outer cylindrical surface 162 above shelf 111 and below rim 128 on the base module 112. Although the vibrator arrangement 152 is shown in the figures as being installed onto base module 112, it could alternatively be installed onto (by clamping or other means of securement, e.g., welding, adhesion) one of the other modules, e.g., any of auxiliary modules 114, 116, 118, or 119 depending on the particular objectives in implementation.

Use of the system involves set up and then actual filtration. Set up involves stacking a clean set of modules in the desired order, e.g., staring with the most restrictive module 112, then stacking auxiliary module 114 on top of it, then stacking auxiliary module 116 above, and finally topping the stack off with the least restrictive auxiliary module 118. The stacking ordinarily will occur initially atop the wastewater tank 108 as shown. Once the auxiliary modules are stacked, the vibration device is secured using band 154 which may or may not utilize a clamping arrangement. In embodiments, tank 108 can be made portable using caster wheels 109 enabling the movement of the stack underneath the spout 102 in the position shown in FIGS. 1 and 2.

It is presumed that ice bath tank 104 has been through the agitation process and trichomes have been sufficiently separated into the water solution as a preliminary. Once that has occurred, and the system 100 is rolled into place under spout 102 as shown in FIGS. 1 and 2, vibrating device 152 is actuated and then after agitation the spout opened. This causes the solution, which includes trichomes, plant materials, and ice water to flow into the top auxiliary module 118. The relatively large screen filter 126 in top auxiliary module 118 removes primarily (completely in embodiments) large plant materials and other items which have relatively low value (e.g., waste). Water and other plant materials (trichomes) then pass into the second auxiliary module 116 where the somewhat more restrictive screen filter 124 sieves out low-grade cannabis product. Materials passing through screen filter 124 then encounter the even more restrictive screen filter 122 in auxiliary module 114 leaving, in embodiments, the highest-grade products. Finally, the ice water solution drops down into base module 112 where the most restrictive of all the filters 120 sieves out still marketable product (mid-grade in embodiments). Once passing through the final module 112, the resulting wastewater is received into tank 108 through an aperture (not shown) where it can be discarded or processed further.

Many different arrangements of the various components depicted, as well as components not shown, are possible without departing from the scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A system for filtering trichomes from a trichome-including plant material, the system comprising:

a plurality of stackable modules configured to receive a source of an aqueous solution including water and trichomes;

a base module included in the plurality of stackable modules;

a base screen filter located inside the base module presenting a degree of restriction using a base screen aperture size;

one or more auxiliary modules included in the plurality of stackable modules, each of the one or more auxiliary modules being stackable on either the base module or another auxiliary module to form a stack;

a first auxiliary module in the one or more auxiliary modules, the first auxiliary module presenting a first auxiliary screen filter having a first aperture size which is greater than the base screen aperture size; and a nesting arrangement allowing the first auxiliary module and the base module to stack together, the nesting arrangement including a shelf extending from the first auxiliary module which is supported by an upper rim portion of the base module.

2. The system of claim 1 wherein the one or more auxiliary modules include a second auxiliary module, the second auxiliary module having a second aperture size which is different from the base screen aperture size and the first aperture size.

3. The system of claim 2 wherein the one or more auxiliary modules include a third auxiliary module, the third auxiliary module having a third aperture size which is different from the base screen aperture size, first aperture size, and second aperture size.

4. The system of claim 3 wherein the one or more auxiliary modules include a fourth auxiliary module, the fourth auxiliary module having a fourth aperture size which is different from the base aperture size, first aperture size, second aperture size, and third aperture size.

5. The system of claim 1 wherein each of the plurality of stackable modules are substantially cylindrical.

6. The system of claim 1 comprising:

a vibration-imparting device connected to the stack and configured to impart vibration into the stack.

7. The system of claim 6 wherein the vibration-imparting device includes a single-phase electric motor.

8. The system of claim 7 wherein the vibration-imparting device is constructed of stainless steel.

9. The system of claim 6 wherein the vibration-imparting device is pneumatically driven.

10. The system of claim 6 wherein the vibration-imparting device is connectable to the stack at a location proximate or on the base module.

11. The system of claim 6 wherein the vibration-imparting device is mounted onto the stack using a cylindrical belt.

12. The system of claim 11 wherein the belt comprises a first portion and a second portion both configured to be connectable to one another about the stack.

13. The system of claim 12 wherein the first and second portions each have first ends which are connected using a hinge.

14. The system of claim 13 wherein the first and second portions also have second ends which are connectable using a clamp.

15. The system of claim 1 wherein the base screen aperture size in the base screen filter is in a range of 43-47 microns.

16. The system of claim 1 wherein the base screen aperture size in the base screen filter is 45 microns in more specific embodiments.

17. The system of claim 1 wherein the base screen aperture size in the base screen filter is the most restrictive of any other screen included in the plurality of stackable modules, and the first screen aperture size in the first auxiliary module is in a range of one of 215-225 microns, 155-165 microns, 115-125 microns, or 88-92 microns.

18. The system of claim 1, wherein the shelf extends out from a lower exterior portion of the first auxiliary module.

19. The system of claim 18 comprising:

a second auxiliary module;

a third auxiliary module; and a fourth auxiliary module, each of the second, third, and fourth auxiliary modules configured to be interchangeably nestable above the base module using substantially the same nesting arrangement utilized between the base and first auxiliary modules.

20. A system for filtering trichomes from plant material, the system comprising:

an ice bath agitator tank;

a spout allowing for drainage from the ice bath agitator tank;

a filtration system including a stacked arrangement formed by a selection of a plurality of stackable filtration modules, the stacked arrangement configured to receive a solution exiting the spout, the plurality of stackable filtration modules including a base module, a first auxiliary module, and a second auxiliary module;

each of the first auxiliary module and the second auxiliary module having a body and a screen filter extending within the body;

each of the first auxiliary module and second auxiliary module being structurally independent and interchangeably nestable into the base module such that when nested, the body of either the first auxiliary module or the second auxiliary module nests with a body of the base module; and a waste-water receptacle configured to receive wastewater after the solution has been filtered using the stacked arrangement of the selection of the plurality of stackable filtration modules.

21. The system of claim 20, wherein the screen filter of the first auxiliary module comprises an outer margin, the outer margin being pinched between an internal surface of a shelf as part of the body.

22. A system for filtering trichomes from a trichome-including plant material, the system comprising:

a plurality of stackable modules configured to receive a source of an aqueous solution including water and trichomes;

a base module included in the plurality of stackable modules;

a base screen filter located inside the base module presenting a degree of restriction using a base screen aperture size;

one or more auxiliary modules included in the plurality of stackable modules, each of the one or more auxiliary modules being stackable on either the base module or another auxiliary module to form a stack;

a first auxiliary module in the one or more auxiliary modules, the first auxiliary module presenting a first auxiliary screen filter having a first aperture size which is greater than the base screen aperture size; and a vibration-imparting device directly coupled to the stack and configured to impart vibration into the stack via a cylindrical belt, the cylindrical belt extending at least partially around the stack.

23. The system of claim 22, wherein the vibration-imparting device is coupled to the base module via the cylindrical belt.

* * * * *